United States Patent [19]
Weskamp

[11] Patent Number: 5,447,220
[45] Date of Patent: Sep. 5, 1995

[54] METHOD AND APPARATUS FOR STABILIZING PALLET-TYPE CONVEYOR SYSTEMS

[76] Inventor: Robert J. Weskamp, 720 Dartmouth Dr., Buffalo Grove, Ill. 60089

[21] Appl. No.: 225,014

[22] Filed: Apr. 7, 1994

[51] Int. Cl.6 ............................................. B65G 17/00
[52] U.S. Cl. ................................ 198/465.2; 198/465.1
[58] Field of Search ............... 198/465.1, 465.2, 465.3, 198/803, 2; 104/172.2, 172.3

[56] References Cited

U.S. PATENT DOCUMENTS

| | | | |
|---|---|---|---|
| 3,949,859 | 4/1976 | Nussbaumer et al. | 198/803.2 X |
| 4,498,397 | 2/1985 | Fuchs et al. | 198/465.1 X |
| 4,564,100 | 1/1986 | Moon | 198/465.3 X |
| 4,924,777 | 5/1990 | Linton et al. | 198/465.1 X |
| 4,934,515 | 6/1990 | Linden | 198/465.3 X |

FOREIGN PATENT DOCUMENTS

| | | | |
|---|---|---|---|
| 0470627 | 2/1992 | European Pat. Off. | 198/465.2 |
| 0718336 | 2/1980 | U.S.S.R. | 198/803.2 |
| 8902805 | 4/1989 | WIPO | 198/465.2 |

Primary Examiner—James R. Bidwell
Attorney, Agent, or Firm—Baker & McKenzie

[57] ABSTRACT

A stabilized pallet-type carrier is provided for use with automatic conveyor systems. The pallet-type carrier includes a stabilizer disposed at outer ends thereof for engaging the track support which keeps the pallet level or horizontal through turns in the conveyor system. The stabilized pallet-type carrier also features spring-biased or spring-loaded shoe assemblies that engage the conveyors. The spring-loaded shoe assemblies provide shock absorbing qualities for the carrier as the carrier is transported by the automated conveyor system. The stabilizing features of the present invention provide an improved pallet-type carrier that maintains a level or horizontal posture during sharp turns in a conveyor system and during a transition between a single conveyor and dual or parallel conveyors. The present invention also provides an improved lightweight pallet guide or shoe that combines the benefits of using a lightweight material such as plastic or polyurethane with the superior wear characteristics of using a metallic material such as steel.

19 Claims, 5 Drawing Sheets

Fig. 4.

METHOD AND APPARATUS FOR STABILIZING PALLET-TYPE CONVEYOR SYSTEMS

FIELD OF THE INVENTION

This invention relates generally to pallet-type carriers used to transport work pieces on conveyors of automated assembly systems. The pallet-type carrier provided by the present invention includes a stabilizing means to keep the pallet in a generally horizontal position through turns and during transport between work stations. The pallet-type carrier also includes an improved pallet guide or shoe that is lightweight and reduces the amount of friction between the conveyor and the shoe.

BACKGROUND OF THE INVENTION

Automated conveyor systems are often used to assemble intricate or delicate work pieces. Pallet-type carriers which ride on top of the conveyors are used to transport the work pieces from one work station to another in the system. A pallet-type carrier usually consists of a flat pallet used to carry a work piece and a lower shoe or puck that rides on top of the moving conveyor. The shoe may also be referred to as a pallet guide.

Pallet-type carriers will often transport a work piece from one station to another in a condition where the work piece is not completely assembled or in a very fragile state. It is imperative to keep the work piece and the pallet, on which the work piece rests, in a horizontal position when transporting the work piece from one station to another station because loose parts that are not securely attached to the work piece may fall off of the pallet between work stations. Further, loose parts may fall off the pallet or become dislodged when the carrier makes a sharp turn, such as a 90° turn. Any tilt of the pallet, in combination with the natural centrifugal forces exerted on the work piece during a sharp turn, can damage the work piece or cause loose parts to be dislodged during the turn.

Therefore, there is a need for stabilized pallet-type carriers for use on automatic conveyor systems. The stabilized pallet-type carriers must be able to transport work pieces from one station to another in a smooth fashion and maintain the general flat or horizontal position of the pallet while the carrier is being transported on the conveyor. Further, the stabilized pallet-type carrier must be able to make sharp turns while maintaining the general flat or horizontal position of the pallet.

Another feature of the pallet-type carrier that can affect the performance of the entire system is the shoe or pallet guide. The shoes often are shaped like a hockey puck and therefore may be commonly referred to as "pucks". The pallet guides or shoes are currently provided in two forms. First, a polyurethane shoe is popular with manufacturers because it is lightweight, requires less energy to transport on top of the conveyor and, because of its lightweight, can reduce the amount of friction between the undersurface of the shoe and the top of the conveyor.

However, polyurethane shoes have not proven entirely satisfactory over time. Specifically, the polyurethane shoes tend to wear prematurely. When used in environments where dust, dirt and grime are present, dirt particles become embedded in the polyurethane shoe. When the polyurethane shoe, embedded with dirt particles, passes over the conveyor, the resulting action is much like rubbing sandpaper on top of the conveyor. As a result, the conveyor chains wear prematurely.

A second type of shoe is one fabricated entirely out of metal. Metal shoes last longer than polyurethane shoes. Further, dust, dirt or grime particles do not become embedded in the undersurface of the metal shoes and therefore the undersurface of the metal shoes remains smooth and does not cause premature wear to the conveyor chain.

However, the metal shoes are much heavier than the polyurethane shoes and when a plurality of pallet-type carriers are employed on a single conveyor, the overall weight transported by the carrier is increased dramatically. Therefore, there is a need for an improved shoe or pallet guide for pallet-type carriers that combines the lightweight of polyurethane or other polymeric materials with the superior wear characteristics of metal shoes, including steel shoes.

SUMMARY OF THE INVENTION

The present invention provides a stabilized pallet carrier that will maintain its horizontal position when traveling from one station to another and when traveling through a sharp turn by equipping the carrier with a means for engaging the track support in the event the carrier tilts.

Specifically, the present invention provides a stabilized pallet in the form of a flat, generally horizontally disposed pallet that is attached to a puck or shoe that engages the conveyor. The pallet-type carrier provided by the present invention is designed to be used with a conveyor that is accommodated within a track support. The outer edges of the pallet extend over the track support.

In order to maintain the level or horizontal posture of the pallet, a means for engaging the track support is provided at the underside of the pallet and protrudes downward therefrom. Therefore, when the pallet tends to tilt or rock from side to side, the means for engaging the track support engages the track support so that the pallet maintains a generally horizontal configuration.

In the preferred embodiment, the pallet also includes a spring-loaded or shock-absorbing shoe which is attached to the pallet as follows. Generally, a hollow base member passes through the pallet and is attached thereto. An upper end of the base member is attached to an outer housing which accommodates a spring. The spring engages an upper end of a shaft that extends downward through the base member. The lower end of the shaft is attached to the shoe. The shaft is stabilized within the base member with bushings. The spring biases the shaft and the shoe downward and therefore biases the shoe against the conveyor. Thus, the attachment of the shoe to the pallet is of a shock absorber configuration which helps to stabilize the pallet as it proceeds from work station to work station.

Longer pallets can also be designed to accommodate two shoes. Each shoe can engage the same conveyor or each shoe can engage a different conveyor in a parallel track system. When the pallet-type carrier is intended to be used in a parallel track or parallel conveyor system, the means for engaging the track support will preferably be disposed outside of either shoe so that the shoes are disposed between the means for engaging the track support.

The preferred means for engaging the track support is at least one ball caster attached to the pallet and extending downward from the underside of the pallet. Two spaced ball casters may be provided adjacent to each shoe so that the casters will limit any rocking motion during the transport of the carrier from one work station to another.

In carriers equipped with two shoes, the shoes will be disposed toward either end of the pallet. A pair of ball casters may be disposed outside the shoe and between the shoe and the distal end of the pallet. Thus, a pair of ball casters is disposed between each shoe and the distal end of the pallet and both shoes are disposed between all four ball casters. This configuration inhibits side-by-side rocking of the pallet when both shoes are being carried by the same conveyor. Further, this configuration prevents forward/backward rocking of the pallet when the two shoes are carried by parallel conveyors.

The use of ball casters is not essential but is a preferred embodiment. Other means for engaging the track support can include bumpers, rollers and spring-biased bumpers disposed at the underside of the pallet. Ball casters work well because when the ball grazes or slightly engages the track supports, the ball rolls on bearings and does not frictionally engage the track support which could disrupt the movement of the carrier and cause the pallet to tilt further. Of course, other suitable means for engaging the track support will be apparent to those skilled in the art.

The use of ball casters and the like are very useful in preventing any rocking of the pallet from its generally horizontal position during turns as will be shown and described with respect to the figures below.

The present invention also includes an improved shoe that combines the lightweight benefits of polyurethane and the superior wear characteristics of metal or steel. Specifically, a shoe is provided with a polyurethane or plastic body which is connected to the pallet guide. The undersurface of the shoe includes a metal skid plate. Thus, the metal skid plate engages the top of the conveyor or conveyor chain. Thus, the improved shoe combines the lightweight benefits of a polyurethane or plastic body with the metal undersurface provided by metal skid plate. The combination plastic body/metal skid plate is provided in a variety of configurations which are illustrated in the figures.

The present invention also lends itself to an improved method of stabilizing pallet-type conveyors. The improved method consists of retrofitting an existing pallet by attaching means for engaging the track supports at outer edges thereof. The retrofit operation may include drilling a hole through the pallet to accommodate a ball caster or simply mounting rollers, bumpers, spring-biased bumpers or ball casters on the underside of the pallet. The method of stabilizing the pallet may also include retrofitting an existing shoe or replacing an existing shoe with a spring-loaded shoe. The spring-loaded shoe may be provided by drilling a hole through the pallet, mounting a hollow base support or base member therein and attaching the base support to the pallet. A shaft may be passed through the base member and a housing accommodating a spring may be attached to an upper end of the base member which biases the shaft downward. The shaft may be then attached to the shoe or may come preattached to the shoe and passed from the underside of the pallet up through the base member. In the preferred embodiment, the body of the shoe is manufactured from a plastic material such as polyurethane and a bottom skid plate is provided. The preferred material for the skid plate is metal, such as steel.

It is therefore an object of the present invention to provide a stabilized pallet-type carrier for use with automated conveyor systems.

Yet another object of the present invention is to provide a spring-loaded shoe for a pallet-type carrier for use with automated conveyor systems.

Still another object of the present invention is to provide a pallet-type carrier that resists side-to-side rocking when it is being transported by an automated conveyor system.

Another related object of the present invention is to provide a pallet-type carrier that resists front-to-rear and rear-to-front rocking when the carrier is being transported on an automated conveyor system.

Yet another related object of the present invention is to provide a means for stabilizing or retrofitting existing pallet-type carriers so that the carriers avoid rocking and tilting during use on automated conveyor systems.

Still another object of the present invention is to provide an improved method of stabilizing pallet-type carriers.

And another object of the present invention is to provide an improved shoe that combines the benefits of a lightweight material such as polyurethane and the long lasting wear resistance of heavier materials such as steel.

Other objects and advantages of the invention will become apparent upon consideration of the following detailed description and appended claims, and upon reference to the accompanying drawings.

BRIEF DESCRIPTION OF THE DRAWINGS

This invention is illustrated more or less diagrammatically in the accompanying drawings, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS

Like reference numerals will be used to refer to like or similar parts from figure to figure in the following description of the drawings.

Figure 1:
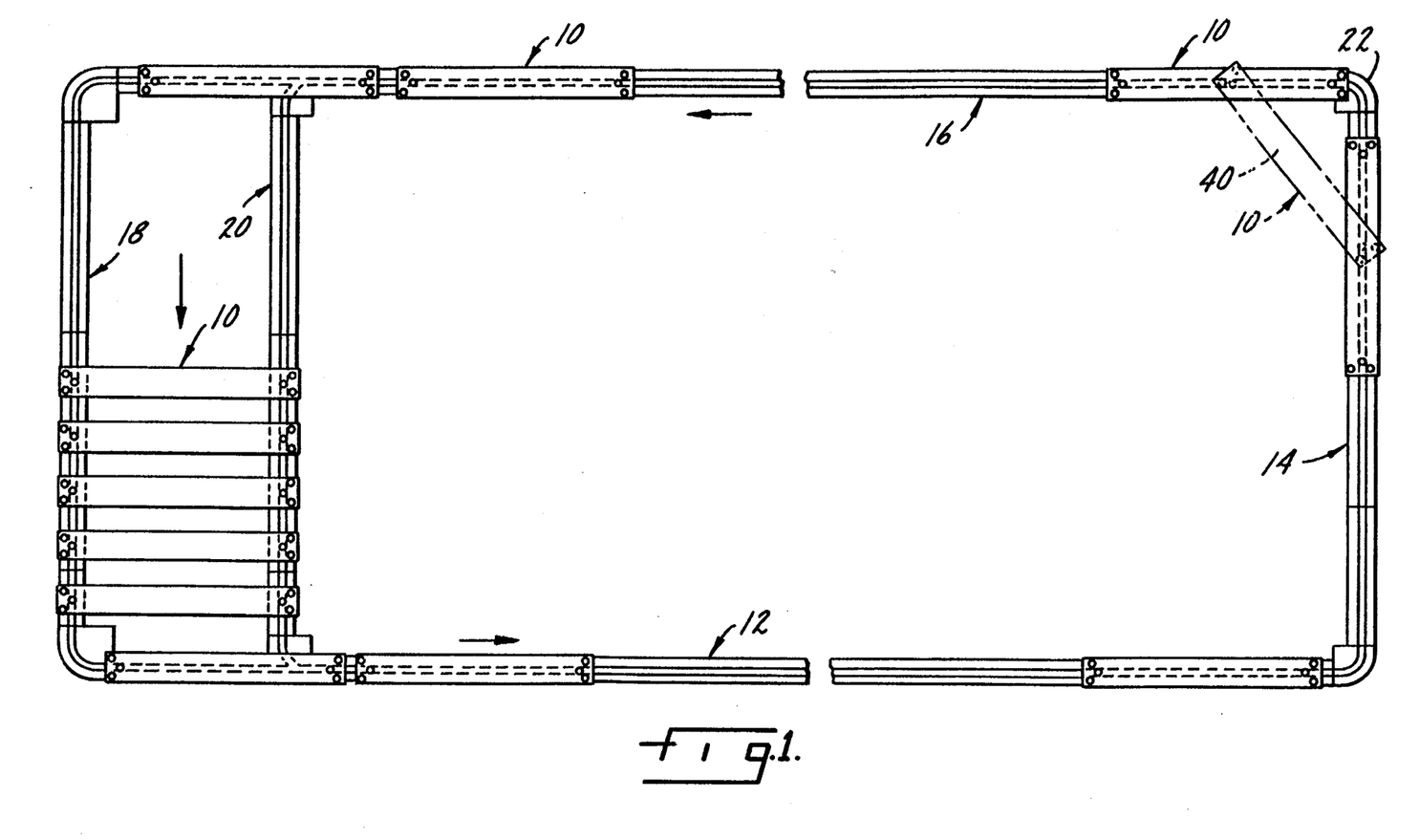
FIG. 1 is a plan view of an automated conveyor system including stabilized pallet-type carriers made in accordance with the present invention.

Turning first to FIG. 1, it will be understood that the pallet-type carriers indicated generally at 10 may be transported by a single conveyor track as shown by the carriers 10 disposed on the portions of track indicated at 12, 14 and 16. Further, the carriers 10 may also be carried by dual or parallel tracks as indicated by the carriers 10 accommodated on parallel sections of track indicated at 18, 20.

The stabilization features provided by the present invention are especially useful when the carrier 10 is required to make a 90° turn as indicated by the carrier 10 indicated in dotted lines at the left turn indicated at 22. The stabilization features of the carriers indicated at 10 also are effective when the carriers make the transition from a single track such as 16 to the dual tracks 18, 20 and when the carriers 10 make the transition from the dual tracks 18, 20 to the single track 12.

Figure 2:
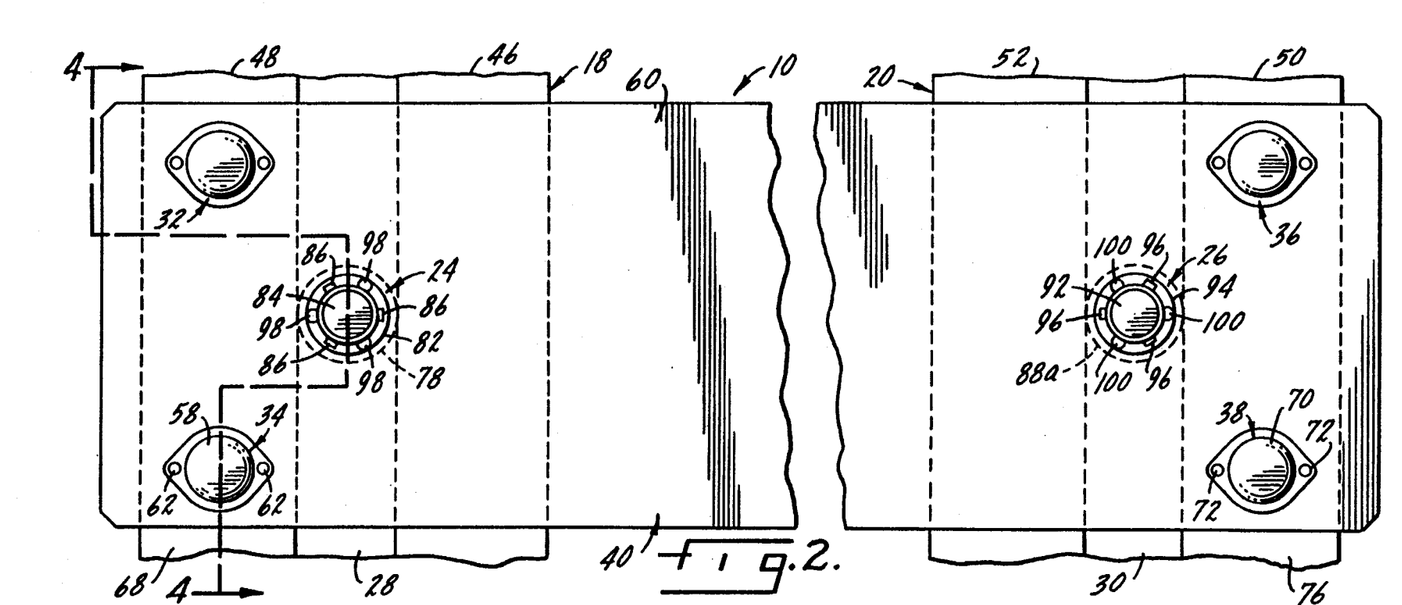
FIG. 2 is an enlarged, partial top plan view of the pallet-type carrier shown in FIG. 1 as it is being transported by two parallel conveyor tracks.

Turning to FIG. 2, a partial illustration of carrier 10 as accommodated in the dual or parallel tracks 18, 20 is illustrated. The carrier 10 includes two shoe assemblies 24, 26 that engage the conveyors 28, 30, respectively. Pairs of ball casters 32, 34 and 36, 38 are disposed at both ends of the pallet 40.

Figure 3:
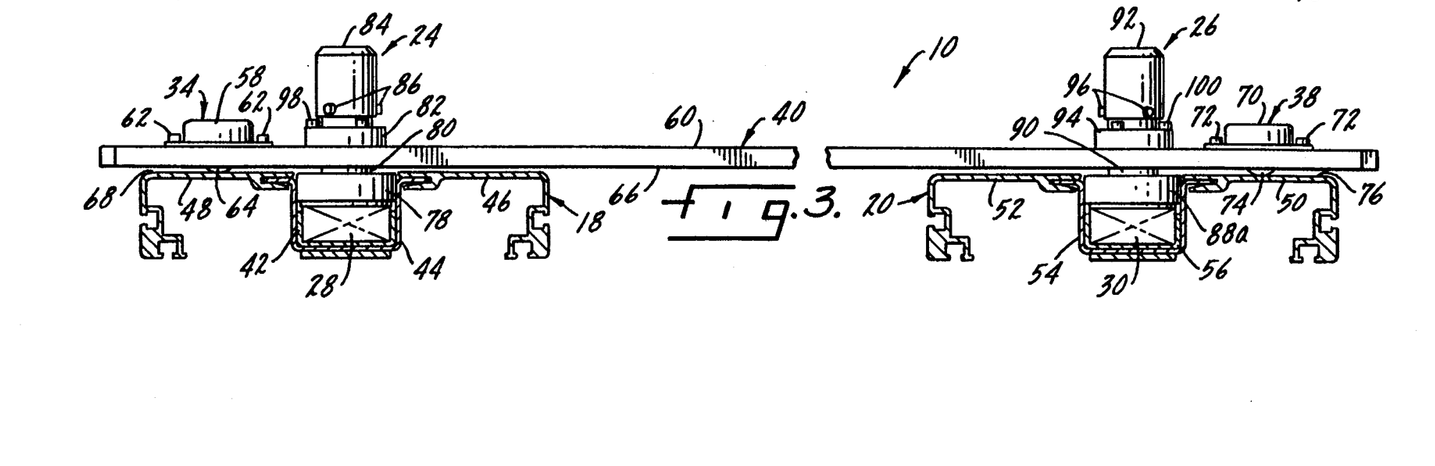
FIG. 3 is an end view of the pallet-type carrier and parallel track system shown in FIG. 2.

Turning to FIG. 3, the track 18 consists of the conveyor 28 which is accommodated in the liner 42 which is supported by the U-shaped support 44. The U-shaped support 44 is suspended between the inside track support 46 and the outside track support 48. Similarly, the track 20 (shown at the right) includes an outside track support 50, an inside track support 52 and a U-shaped base support 54 disposed therebetween. The liner 56 accommodates the conveyor 30.

The ball caster shown at 34 includes a housing 58 that may be attached to the upper surface 60 of the pallet 40 by bolts, screws or other fasteners indicated generally at 62. A rotating ball 64 which is partially enclosed within the housing 58 extends down through the undersurface 66 of the pallet 40. If the pallet 40 rocks downward toward the upper surface 68 of the outside track support 48, the ball 64 engages the surface 68 and prevents frictional engagement between the undersurface 66 of the pallet 40 and the upper surface 68 of the outside track support 48.

Similarly, turning to the ball caster indicated at 38, the housing 70 is attached to the upper surface 60 of the pallet 40 with fasteners 72. The rotatable ball 74 extends downward through the undersurface 66 of the pallet 40 and engages the upper surface 76 of the outside track support 50 in the event the pallet 40 rocks downward toward the upper surface 76 of the track support 50.

The shoe assembly 24 includes the shoe 78 which engages and rides upon the conveyor 28. The shoe 78 is disposed at the lower end of the shaft 80 which extends upward through the base member 82. An upper housing 84 is attached to the base member 82 with fasteners indicated generally at 86. A spring 88 (see FIG. 4) is disposed within the upper housing 84 and biases the shaft 80 and shoe 78 downward against the conveyor 28.

Similarly, the shoe assembly 26 includes the shoe 88a which is disposed at the distal end of the shaft 90 which is biased downward by a spring (not shown) that is enclosed within the upper housing 92. The housing 92 is attached to the base member indicated generally at 94 by fasteners indicated generally at 96. The fasteners 98 attach the base member 82 to the upper surface 60 of the pallet 40; the fasteners 100 attach the base member 94 to the upper surface 60 of the pallet 40.

Figure 4:
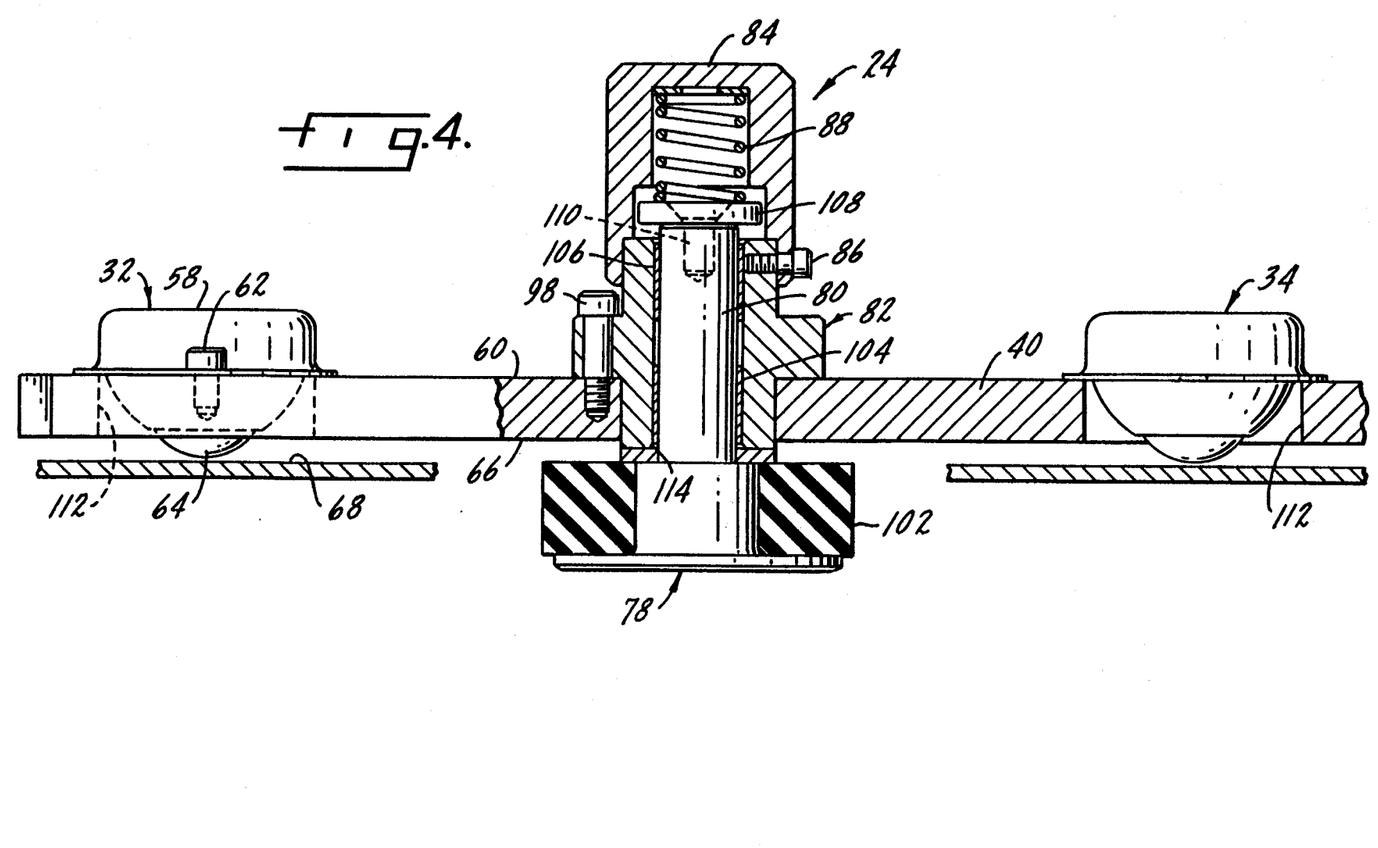
FIG. 4 is a sectional view taken substantially along line 4—4 of FIG. 2.

Turning to FIG. 4, the shoe 78 may be coated with an elastomeric material 102 to further absorb shock when the shoe 78 engages the inside walls of the U-shaped support 44 or one-half of the liner 56 (see FIG. 3). Further, it will be noted that the shaft 80 engages bushings indicated at 104, 106 within the base member 82. The position of the shaft 80 within the base member 82 and upper housing 84 is secured by the retainer 108 which is held in place by the fastener indicated at 110. The spring 88 biases the shaft 80 and shoe 78 downward toward the conveyor.

Thus, to assemble the shoe assembly 24, the base member 82 is attached to the upper surface 60 of the pallet 40 with the fasteners 98. Then, the shaft 80, already attached to the shoe 78, is passed upward through the lower end 114 of the base member 82. Then, the washer or retainer 108 is attached with the fastener 110 before the upper housing 84, with the spring 88 disposed therein, is attached to the base member 82 with the fasteners 86. Preferably, the base member 82 is equipped with bushings 104, 106 which stabilize the shaft 80 within the base member 82.

The ball caster 34 is attached to the pallet 40 by first drilling a hole indicated at 112 through the pallet 40 before the unitary caster assembly 34 is disposed therein and attached with the fasteners 62. The caster housing 58 preferably includes bearings for low friction rotation of the ball 64 within the housing 58.

Thus, the ball casters 32, 34, 36, 38 prevent rocking of the pallet 40 from side to side as illustrated in FIGS. 2 and 3. Further, the spring-biased shoe assemblies 24, 26 act in a manner similar to shock absorbers as the carrier 10 is transported by the dual tracks 18, 20.

When making a 90° turn as shown in the upper right hand corner of FIG. 1, the ball casters keep the pallet 40 level throughout the turn and further both the ball casters 32, 34, 36, 38 and spring-biased shoe assemblies 24, 26 help provide a smooth transition from the straight line of track indicated at 16 to the dual tracks indicated at 18, 20.

The combination of the casters 32, 34, 36, 38 and spring-biased or spring-loaded shoe assemblies 24, 26 help provide a smooth transition from the dual tracks indicated at 18, 20 to the single track indicated at 12.

Figure 5:
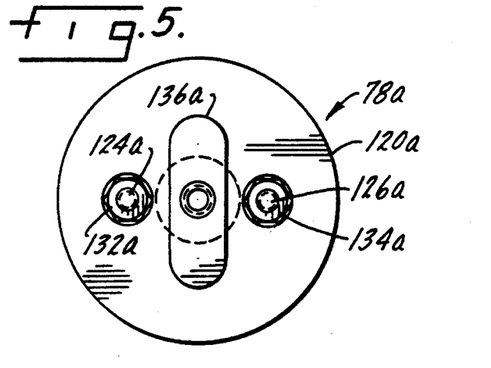
FIG. 5 is a top plan view of an improved pallet guide or shoe made in accordance with the present invention.
Figure 6:
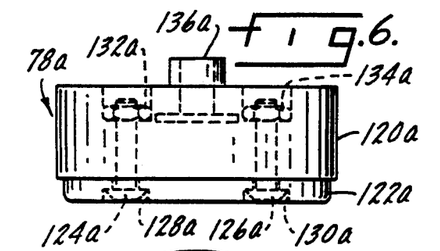
FIG. 6 is a front elevational view of the shoe shown in FIG. 5.
Figure 7:
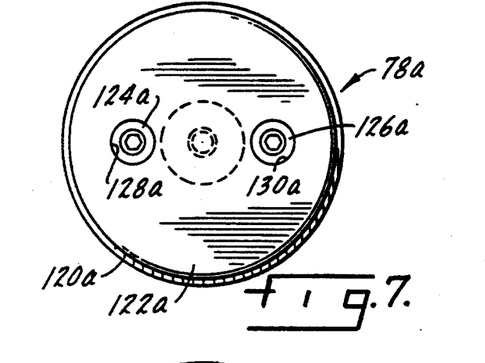
FIG. 7 is a bottom plan view of the shoe shown in FIG. 5.
Figure 8:
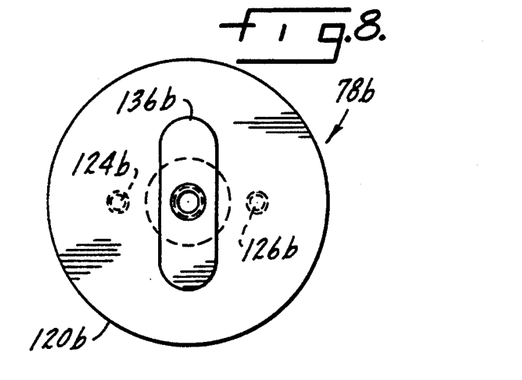
FIG. 8 is a top plan view of yet another shoe made in accordance with the present invention.
Figure 9:
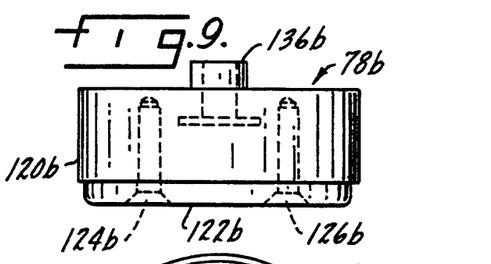
FIG. 9 is a front plan view of the shoe shown in FIG. 8.
Figure 10:
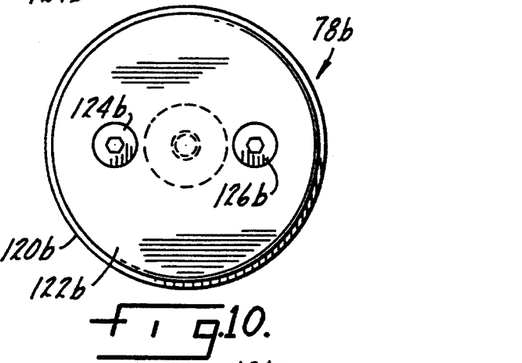
FIG. 10 is a bottom plan view of the shoe shown in FIG. 8.
Figure 11:
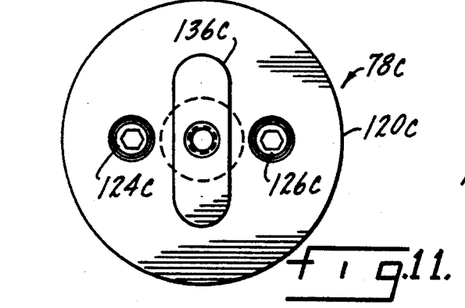
FIG. 11 is a top plan view of yet another alternative shoe made in accordance with the present invention.
Figure 12:
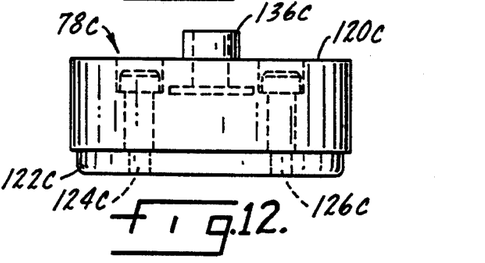
FIG. 12 is a front plan view of the shoe shown in FIG. 11.
Figure 13:
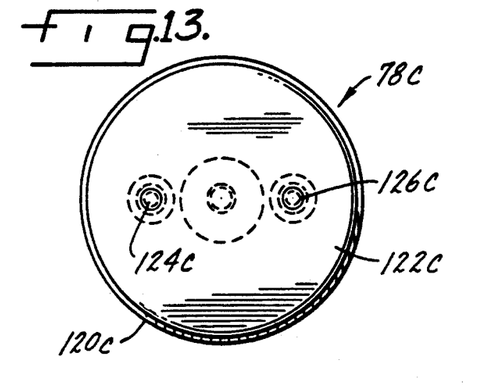
FIG. 13 is a bottom plan view of the shoe shown in FIG. 11.
Figure 14:
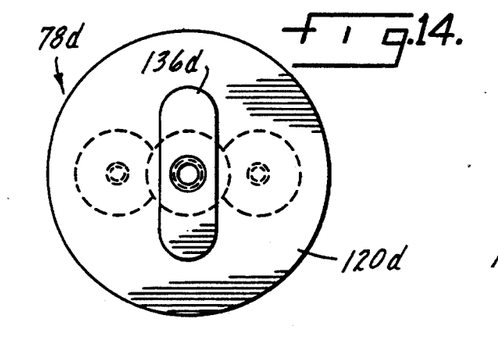
FIG. 14 is a top plan view of still another alternative shoe made in accordance with the present invention.
Figure 15:
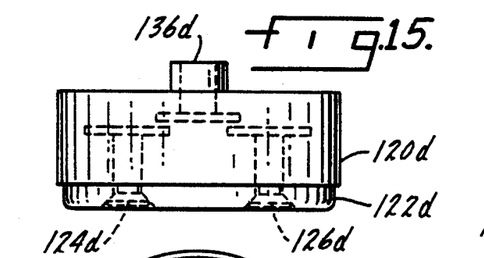
FIG. 15 is a front plan view of the shoe shown in FIG. 14.
Figure 16:
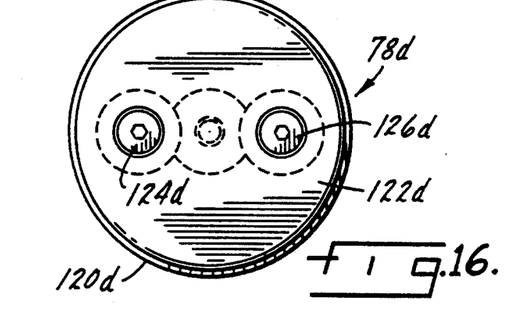
FIG. 16 is a bottom plan view of the shoe shown in FIG. 14.
Figure 17:
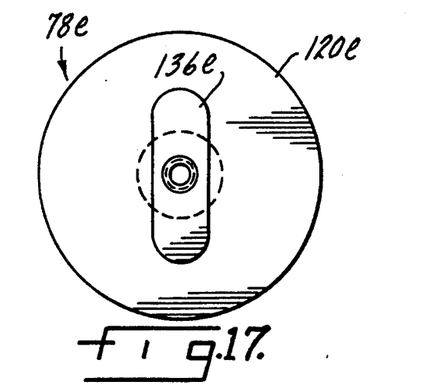
FIG. 17 is a top plan view of another alternative shoe made in accordance with the present invention.

In addition to the elastomeric-coated shoe 78 shown in FIG. 4, a series of improved shoes 78a-78e are shown in FIGS. 5-19. Specifically, turning to FIG. 5, the shoe 78a includes a body 120a that is preferably made from a lightweight material such as polyurethane or other plastic material with a metal skid plate 122a attached to the underside thereof as shown in FIG. 6. In the embodiments shown in FIGS. 5-7, the metal skid plate is attached by two screws 124a, 126a that extend upward through the holes 128a, 130a in the skid plate 122a and are attached to the body 120a by nuts or other fasteners 132a, 134a. The means for attaching the shoe 78a to the shaft 80a is shown generally at 136a.

Figure 18:
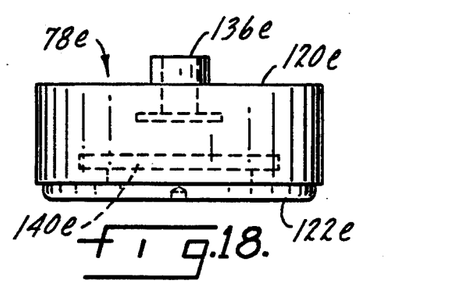
FIG. 18 is a front plan view of the shoe shown in FIG. 17.
Figure 19:
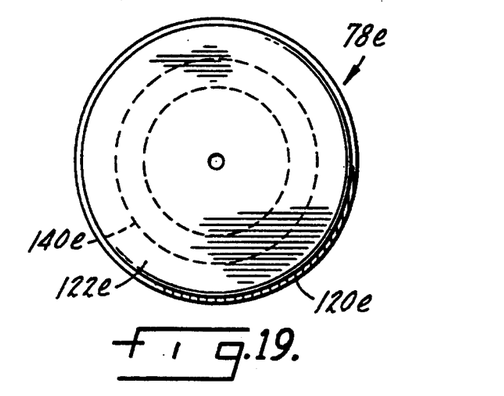
FIG. 19 is a bottom plan view of the shoe shown in FIG. 17.

Four other shoe embodiments 78b-78e are illustrated in FIGS. 8-19. Like reference numerals are used to describe similar parts from figure to figure. Referring to FIG. 18, it will be noted that the body 120d is molded around the extension 140e and requires no fasteners such as those indicated at 124, 126 in FIGS. 5-16.

Thus, the present invention provides important stabilization qualities to pallet-type carriers transported on automatic conveyor systems. Stable pallet-type carriers are important in the manufacture of intricate products such as electronic products where parts may not be completely attached or soldered onto work pieces before they are transported from one work station to another. Thus, the present invention provides an improved pallet-type carrier for automatic conveyor systems.

While only one preferred embodiment of the present invention has been illustrated and described, it will at once be apparent to those skilled in the art that variations may be made within the spirit and scope of the present invention. Accordingly, it is intended that the scope of the invention be limited solely by the scope of the hereafter appended claims and not by any specific wording in the foregoing description.

I claim:

1. A stabilized pallet assembly for transport by at least one conveyor carried by at least one track support, the pallet assembly comprising:
    a pallet assuming a generally horizontal position above the conveyor, the pallet including two opposing ends,
    at least two shoes for engaging at least one conveyor and supporting the pallet in a horizontal position above one conveyor, the shoes being disposed toward the opposing ends of the pallet,
    means for attaching each of said shoes to the pallet,
    means protruding downward from an underside of the pallet for engaging the track support when the pallet tilts from the generally horizontal position,
    the shoes also capable of engaging two conveyors so that each opposing end of the pallet is disposed above a different conveyor with the pallet supported above and between the two conveyors.

2. The pallet assembly of claim 1,
    wherein the means for attaching each of said shoes to the pallet includes a vertically oriented spring that biases the shoe downward against the conveyor.

3. The pallet assembly of claim 2,
    wherein the means for attaching each of said shoes to the pallet further comprises
    a hollow base member attached to the pallet and passing through a hole disposed in the pallet,
    an upper end of the base member attached to a housing,
    the housing accommodating a spring, the spring being disposed between the housing and an upper end of a shaft,
    the shaft passing through the base member and a lower end of the shaft being attached to the shoe,
    an undersurface of the shoe engaging an upper surface of the conveyor.

4. The pallet assembly of claim 3,
    wherein an outer periphery of each of said shoes is covered with an elastomer material.

5. The pallet assembly of claim 3,
    wherein each of said shoes comprises a body and a bottom skid plate, the body being molded from plastic, the skid plate being fabricated from steel.

6. The pallet assembly of claim 1,
    wherein the means protruding downward from an underside of the pallet for engaging the track support when the pallet tilts from the generally horizontal position is a ball caster.

7. The pallet assembly of claim 1,
    wherein the means protruding downward from an underside of the pallet for engaging the track support when the pallet tilts from the generally horizontal position includes two ball casters.

8. A stabilized pallet assembly for transport by at least one conveyor carried by a track support, the pallet assembly comprising:
    a pallet assuming a generally horizontal position above the conveyor,
    at least two shoes for engaging the conveyor, each of said shoes including
    a hollow base member attached to the pallet and passing through a hole disposed in the pallet, an upper end of the base member attached to a housing, the housing accommodating a spring, the spring being disposed between the housing and an upper end of a shaft, the shaft passing through the base member and a lower end of the shaft being attached to a shoe, an undersurface of each shoe engaging an upper surface of the conveyor,
    the shoes supporting the pallet so that the each shoe is capable of engaging a different conveyor so that each opposing end of the pallet is disposed above a different conveyor with the pallet supported above and between the two conveyors,
    at least one ball caster attached to the pallet and protruding downward from an underside of the pallet for engaging the track support when the pallet tilts from the generally horizontal position.

9. The pallet assembly of claim 8,
    wherein an outer periphery of each of said shoes is covered with an elastomer material.

10. The pallet assembly of claim 8,
    wherein each shoe comprises a body and a bottom skid plate, the body being molded from plastic, the skid plate being fabricated from steel.

11. A method of stabilizing a pallet-type carrier transported by two conveyors, each conveyor carried by a track support, the pallet-type carrier including two shoes, each shoe for engaging one of the conveyors, the method comprising:
    providing means, protruding downward from an underside of the pallet adjacent to one side of each shoe, for engaging the track support when the pallet tilts from the generally horizontal position;

attaching each shoe to the pallet with a spring-loaded apparatus comprising a hollow base member attached to the pallet and passing through a hole disposed in the pallet, an upper end of the base member attached to a housing, the housing accommodating a spring, the spring being disposed between the housing and an upper end of a shaft, the shaft passing through the base member and a lower end of the shaft being attached to a shoe, an undersurface of the shoe engaging an upper surface of the conveyor;

supporting the pallet above the conveyors and above the track supports so that the shoes are capable of engaging a single conveyor so that the pallet is disposed above a single conveyor; and supporting the pallet above the conveyors and above the track supports so that the shoes are capable of engaging two conveyors so that each opposing end of the pallet is disposed above a different conveyor with the pallet supported above and between the two conveyors.

12. The method of claim 11, wherein said means includes a pair of ball casters adjacent to each shoe, each pair of ball casters being disposed on an outside portion of the pallet so that the two shoes are disposed between the two pairs of ball casters.

13. A stabilized pallet assembly for transport by one or more conveyors, each conveyor carried by a track support, the pallet assembly comprising:

a pallet assuming a generally horizontal position above the conveyors and above the track supports, the pallet including two opposing ends, means for supporting the pallet above the conveyors and above the track supports disposed toward the opposing ends of the pallet and thereby supporting the opposing ends of the pallet above the conveyors and above the track supports, means protruding downward from an underside of the pallet for engaging the track support when the pallet tilts from the generally horizontal position, the means for supporting the pallet above the conveyors and above the track supports capable of engaging a single conveyor so that the pallet is disposed above a single conveyor, the means for supporting the pallet above the conveyors and above the track supports capable of engaging two conveyors so that each opposing end of the pallet is disposed above a different conveyor with the pallet supported above and between the two conveyors.

14. The pallet assembly of claim 13, wherein the means for supporting the pallet above the conveyors and above the track supports is further characterized as including two shoes, each shoe engaging a conveyor, and means for attaching each shoe to the pallet.

15. The pallet assembly of claim 14, wherein the means for attaching each shoe to the pallet includes a vertically oriented spring that biases the shoe downward against the conveyor.

16. The pallet assembly of claim 15, wherein the means for attaching each shoe to the pallet further comprises a hollow base member attached to the pallet and passing through a hole disposed in the pallet, an upper end of the base member attached to a housing, the housing accommodating a spring, the spring being disposed between the housing and an upper end of a shaft, the shaft passing through the base member and a lower end of the shaft being attached to the shoe, an undersurface of the shoe engaging an upper surface of the conveyor.

17. The pallet assembly of claim 16, wherein each shoe comprises a body and a bottom skid plate, the body being molded from plastic, the skid plate being fabricated from steel.

18. The pallet assembly of claim 17, wherein the means protruding downward from an underside of the pallet for engaging the track support when the pallet tilts from the generally horizontal position is a ball caster disposed adjacent to each shoe, each ball caster attached to the pallet on opposing sides thereof with the shoes disposed between the ball casters.

19. The pallet assembly of claim 17, wherein the means protruding downward from an underside of the pallet for engaging the track support when the pallet tilts from the generally horizontal position includes a pair of ball casters adjacent to each shoe, each pair of ball casters being disposed on an outside portion of the pallet so that the two shoes are disposed between the two pairs of ball casters.

* * * * *